Oct. 11, 1938.　　　E. T. JOHNSON　　　2,132,955
OVERBAND FOR TRACTION WHEELS
Filed April 24, 1935
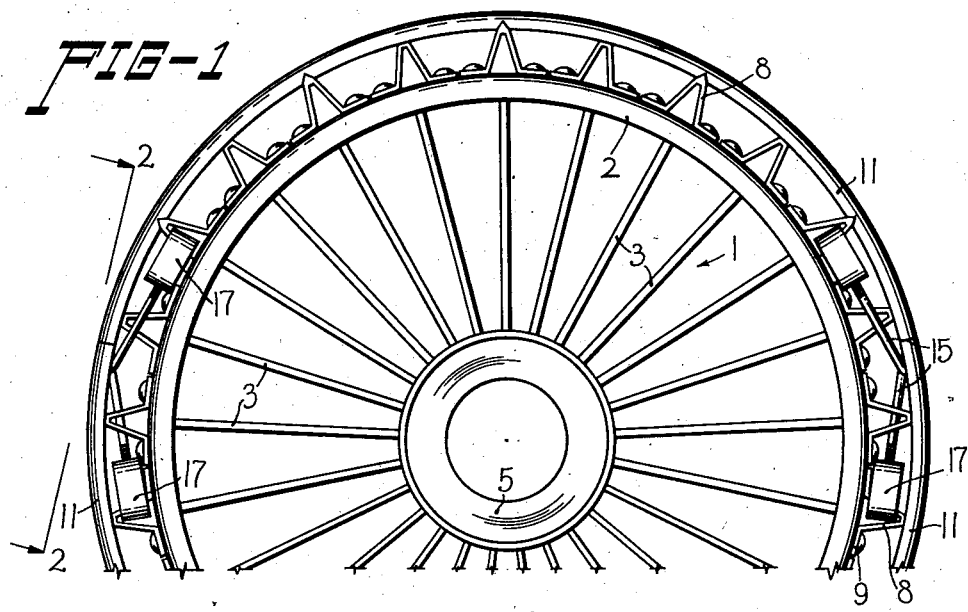
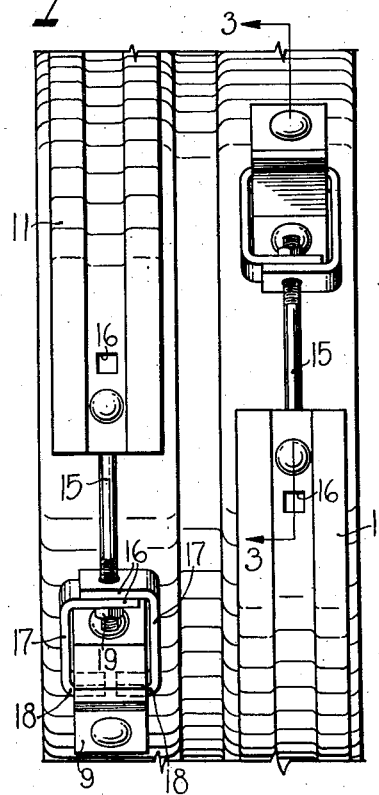
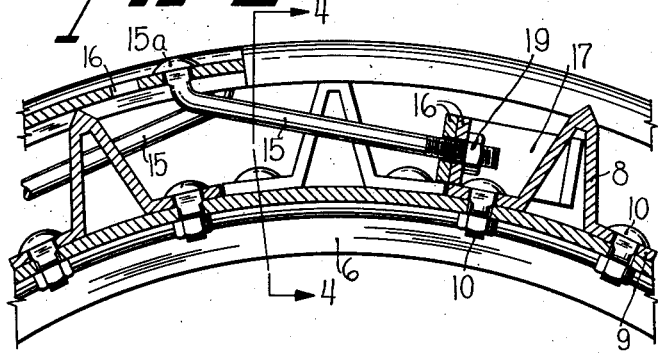
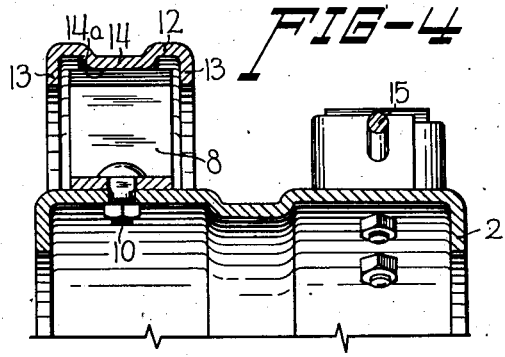
INVENTOR
Ellsworth T. Johnson
BY Brown, Jackson, Boettcher & Dienner
ATTORNEYS.

Patented Oct. 11, 1938

2,132,955

UNITED STATES PATENT OFFICE 2,132,955

OVERBAND FOR TRACTION WHEELS

Ellsworth T. Johnson, Moline, Ill., assignor to Deere & Company, Moline, Ill., a corporation of Illinois Application April 24, 1935, Serial No. 17,897

13 Claims. (Cl. 301—39)

The present invention relates generally to traction wheels and the like, such as those employed in tractors, harvesting machines and the like, either for driving a vehicle or for driving mechanism carried by the machine.

Usually traction wheels and the like are provided with lugs or grousers to furnish and increase the traction and to prevent the wheel from slipping relative to the ground surface. However, when the machine or tractor is operated or moved along surfaced roads and highways, the use of lugs and grousers is usually objectionable on account of the tendency to mar or penetrate the road surface. While grousers are frequently arranged to provide a road engaging surface which is continuous so far as lying in a cylinder is concerned, most lugs, particularly spade lugs, tend to destroy the road surface over which the machine moves. Some states forbid the use of tractors and similar machines with spade lugs on pavements, and in order to meet the requirement of such laws and to provide for the satisfactory movement of machines, such as tractors, harvesting machines and the like having traction wheels, over surfaced roads and highways, it has been proposed to provide means in the form of road bands, transport rims, overbands and the like which are capable of being attached to traction wheels, usually to the rims thereof, so as to provide a continuous smooth road engaging surface for the wheels and to keep the lugs and grousers out of contact with the road surface.

The principal object of the present invention is the provision of certain new and useful improvements in such road bands or transport rims and the like, and it is the principal object of the present invention to provide an arrangement in which the transport rim means may be easily and quickly attached and detached and will, at the same time, accommodate variations in the size of the lugs or diameter of the traction wheel to which the transport rim means is secured. Specifically, it is an object of the present invention to provide a transport rim or overband which is adapted to be mounted directly on the lugs or grousers of a traction wheel, and a further object of the present invention is the provision of attaching means reacting against one or more of the traction wheel lugs for clamping the transport rim in place on the wheel.

A further object of the present invention is the provision of a transport rim provided with flanges adapted to be disposed on opposite sides of the traction wheel lugs so as to hold the transport rim in place when it is tightened around the lugs, and a further object of the present invention is the provision of attaching means cooperating with spade lugs having lateral openings therethrough to receive a portion of the attaching means and operable when tightened to clamp the overband means in position.

A further object of the present invention is the provision of an overband structure which comprises two generally semi-circular members, one being adapted to be disposed over the lugs of one row while the other member is adapted to be disposed over lugs of an adjacent row, whereby the members are spaced apart axially, but their ends overlap so as to provide a continuous road engaging surface. By the use of a construction of this nature, various sizes of wheels may be accommodated and the transport rim members may be quickly placed in position without lifting the wheel off the ground. Also by such construction, various heights of lugs are accommodated, as when lugs wear down or new and higher lugs are installed. When the overband structure is mounted on the smaller lugs the ends of the transport rim members merely overlap a greater distance than when used on the larger lugs, or when used on a wheel of somewhat greater diameter.

These and other objects of the present invention will be apparent to those skilled in the art after a consideration of the preferred construction illustrated in the accompanying drawing, forming a part of this specification.

In the drawing:—

Figure 1 is a side view of a traction wheel embodying the principles of the present invention;

Figure 2 is a view taken substantially along the line 2—2 of Figure 1 and looking in the direction of the arrows;

Figure 3 is a section taken along the line 3—3 of Figure 2; and

Figure 4 is a section taken along the line 4—4 of Figure 3.

Referring now to the drawing, more particularly to Figures 1 and 3, the wheel proper is indicated in its entirety by the reference numeral 1 and includes a wheel rim or tire section 2 connected by spokes 3 to a central hub 5. The wheel rim or tire 2 carries two rods (Figure 2) of grousers or lugs 8 secured to the wheel rim 2 in spaced staggered relation. For purposes of illustration, I have shown the grousers 8 in the form of spade lugs of the open pressed steel type of inverted V-shape formation presenting laterally directed open spaces and having bent sections 9 apertured to receive the bolts 10 which secure the lugs to the rim 2. While the present invention is not necessarily limited to a wheel construction having lugs of this type, I have preferred to illustrate the present invention as embodied in a wheel equipped with spade lugs for it is generally recognized that spade lugs penetrate the ground without horsepower loss and provide greater tractive ability and freedom from slippage.

The transport rim construction, according to the principles of the present invention, is mounted over the lugs 8 and comprises a pair of substantially semi-circular rim members 11 which are preferably constructed of channel iron having a base or road engaging surface 12 and radially inwardly extending side or marginal flanges 13. Each of the transport rim members 11 has some flexibility to permit the easy mounting of the members over the associated lugs, and when so mounted in position the base 12 is of sufficient width to permit the flanges 13 to extend on opposite sides of the radially outer ends of the lugs 8, whereby lateral displacement of the transport rim members 11 is effectively prevented. A central longitudinal groove 14, facing radially outwardly, is provided in the outer or tread surface of the base 12, and the formation of this groove establishes a radially inwardly facing ridge 14a which engages the outer edges of the lugs 8 which the transport rim members embrace.

In mounting the rim members 11, the members are disposed in the positions shown in Figures 1 and 2, one member being mounted over approximately half of the lugs of one row, while the other member is mounted in substantially diametrically opposite relation over approximately half of the lugs of the other row.

By virtue of this arrangement, the ends of the two transport rim members overlap, as best shown in Figure 2, that is, the ends of one rim member extend beyond the plane of the ends of the other rim member, thereby providing a smooth continuous substantially cylindrical road engaging surface for the wheel 1, permitting its use over pavements and surfaced roads and highways.

If there is an uneven number of lugs in each row, the roadbands can be of the same length and substantially identical, but if there is an even number of lugs in each row, as illustrated, the two bands are preferably not quite the same length, one being more than a half circle and the other slightly less, with an overlap at each end of the order illustrated in Figure 2. The roadbands could, of course, be made exactly the same length, but this would cause a somewhat greater amount of overlap than would be necessary. In any event, whether with an even or an odd number of lugs, at least one of the roadbands extends for slightly more than 180°.

By providing an overband construction as a split ring or as two sections, wheels of different diameters or different heighths of lugs are accommodated. When mounted over the smaller size lugs or lugs that have worn down, or on wheels of smaller diameter, the ends of the transport rim members 11 merely overlap a greater distance than when used on the larger lugs or wheels of somewhat greater diameter. Another advantage of employing a transport rim construction having separable sections lies in the ability to apply the same without lifting the wheel off the ground. That is, one of the rim members may be applied, the wheel rotated through substantially a half revolution, and then the other rim member may be similarly applied.

Attaching means of novel construction is employed for securing the transport rim members in position over the lugs of the wheel, there being two pairs of such attaching means for the two rim members, and since the clamping means are of identical construction the description of one will suffice.

A clamping bolt 15 has its head 15a disposed at an angle to the main body of the bolt and disposed in one of the openings 16 formed in the associated end of the rim member 11, and preferably the principal portion of the bolt head 15a is disposed below the road engaging surface of the transport rim so as not to break the smooth continuity of the road engaging surface provided by the transport road bands. The bolt 15 extends generally in the same direction as the rim members, approximately tangential with respect to the rim 2 of the wheel 1, and the bolt 15 is of such length as to extend peripherally beyond the end of the associated rim 11. The free end of the bolt 15 is threaded and projects through aligned holes provided in the adjacent overlapping arms of a pair of yokes or U-shaped clamping brackets 17, as best shown in Figures 2 and 3. The opposite arms 18 of the central pair of U-shaped brackets 17 are disposed substantially in abutting relation and are received within the laterally extending open space of one of the wheel lugs 8; and a nut 19 is threaded onto the bolt 15 so that, when tightened, the associated end of the transport rim member 11 is held in position on the lugs 8. When the nuts 19 are loosened to permit the brackets 17 being detached from the associated lugs in the removal of the overbands, it is to be noted that the brackets 17 are still fastened to the rim members 11 so that there is no danger of any of the parts becoming lost. While I prefer to use a pair of attaching brackets for each end of each road band half, a single bracket may be used instead of two, if desired.

A clamping means, such as the one described above, is provided for each end of both of the transport rim members 11, and when all of the bolts 15 are tightened, the transport rim members 11 are securely fastened on the wheel lugs, the flanges 13 embracing the radially outer ends of the lugs to prevent the transport rims from slipping laterally off the lugs 8 while the clamping means themselves serve to prevent endwise or peripheral displacement of the rim members 11.

It will be noted from Figure 4 that the grooved section 14 of the transport rims is seated firmly against the ends of the lugs so that there is no tendency for the transport rims to bind upon or break the ends of the lugs.

While I have shown and described above the preferred structure in which the principles of the present invention have been embodied, it is to be understood that the present invention is not to be limited to the particular details shown and described, but that, in fact, widely different means may be employed in the practice of the broader aspects of my invention.

What I claim, therefore, and desire to secure by Letters Patent, is:—

1. The combination with a traction wheel having at least two rows of generally radially extending lugs, of at least two road bands, each consisting of a generally arcuate member, one band being disposed over and acting against the radially outer ends of a plurality of lugs of one row and the other band being disposed over and acting against the radially outer ends of a plurality of lugs of the other row generally diametrically opposite to said first lugs, the adjacent ends of said bands overlapping to provide in effect a continuous cylindrical road engaging surface for said wheel, and means acting between the ends of the bands and the adjacent lugs for securing each of said bands in position on said wheel.

2. The combination with a traction wheel having at least two rows of generally radially extending lugs, of a pair of road bands, each consisting of a generally semi-circular member, one band being disposed over and embracing the radially outer ends of a plurality of lugs of one row and the other band being disposed over and embracing the radially outer ends of a plurality of lugs of the other row generally diametrically opposite to said first lugs, the adjacent ends of said bands overlapping to provide in effect a continuous cylindrical road engaging surface for said wheel, and means at each end of each band reacting in a generally circumferential direction against certain of the lugs of each row other than said plurality of lugs for tightening the bands, respectively, against the radially outer ends of the lugs on said wheel.

3. The combination with a traction wheel having at least two rows of generally radially extending spade lugs, each having a lateral opening extending therethrough transversely of the wheel, of a pair of road bands, each consisting of a generally semi-circular member, one band being disposed over a plurality of lugs of one row and the other band being disposed over a plurality of lugs of the other row generally diametrically opposite to said first lugs, the adjacent ends of said bands overlapping to provide in effect a continuous cylindrical road engaging surface for said wheel, bolt means carried by the ends of each of said road bands and extending generally along the periphery of the wheel, and means connecting each of said bolt means with an adjacent lug and including a member receiving the threaded end of the associated bolt and having a portion disposed within the lateral opening of the lug and reacting thereagainst for securing the associated band in place on the wheel.

4. A transport rim construction for traction wheels and the like having lugs, said transport rim construction comprising a pair of substantially semi-circular channeled members adapted to be secured over said lugs and including generally radially inwardly extending flanges adapted to be disposed on both sides of said lugs and acting to hold said rim members in lateral position over said lugs, said channeled rim members having some flexibility and being adapted to be mounted on said wheel in laterally spaced relation, axially of the wheel, whereby the ends of said rim members overlap to a greater or less extent, accommodating wheels of various diameters, and two pairs of members extending in opposite directions and connected, respectively, with the ends of said rim members for clamping the latter tightly around the associated lugs.

5. In a road band construction for traction wheels and the like having lugs, a generally semi-circular shallow channeled member adapted to be applied over the lugs on a wheel, said channeled member having radially inwardly directed flanges that are arranged to embrace the sides of the lugs and hold the band against lateral displacement on said lugs when the band is held circumferentially on a wheel but are sufficiently narrow so that said band is flexible and can be sprung in applying it over the lugs on the wheel and is adapted to accommodate variations in diameter of the latter, and circumferentially acting fastening means for securing the ends of the channeled member to said wheel.

6. In a road band construction for traction wheels and the like having lugs, a generally arcuate channeled member having radially inwardly extending flanged margins spaced apart laterally so as to clear the laterally outer edges of said lugs and adapted to be clamped against and embrace the radially outer ends of said lugs, said channeled member having a central depressed portion engageable with the radially outer ends of said lugs and serving to maintain the remainder of the channeled member normally out of contact with the corners of said lugs, and attaching means carried by the end portions of said channeled member for fastening the latter to the wheel.

7. In a road band construction for traction wheels and the like having lugs, a generally arcuate channeled member having radially inwardly extending flanged margins adapted to be clamped against and embrace the outer ends of said lugs, said channeled member also having a central depressed portion forming a peripheral groove, and attaching means carried by the end portions of said channeled member, said attaching means including a bolt disposed in an aperture in the central grooved portion of said channeled member having a head seated in said groove so as to lie substantially flush with the road contacting surface of said channeled member, and a pair of yoke members adapted to engage one of said wheel lugs and having apertured end portions, the threaded end of said bolt being adapted to be received and to react against said apertured end portions.

8. The combination with a traction wheel having a row of generally radially extending spade lugs, each having a lateral opening extending therethrough transversely of the wheel, of a road band consisting of a generally semi-circular member, bolt means carried by each of the ends of said road band and extending generally outwardly therefrom in opposite directions along the periphery of the wheel, and means connecting each of said bolt means with an adjacent lug and including a part extending into the lateral opening thereof for securing the band in place on the wheel.

9. In a road band construction for traction wheels and the like having lugs, a generally arcuate channeled member having radially inwardly extending flanged margins adapted to be clamped against and embrace the outer ends of said lugs, and attaching means carried by the end portions of said channeled member, said attaching means including a bolt disposed in an aperture in said channeled member, and a pair of yoke members adapted to engage one of said wheel lugs and having apertured end portions, the threaded end of said bolt being adapted to be received and to react against said apertured end portions.

10. A transport rim construction for traction wheels and the like having lugs, said transport rim construction comprising a pair of members adapted to be secured over and in contact with said lugs, said rim members having some flexibility and being adapted to be mounted on said wheel in laterally spaced relation, axially of the wheel, the lengths of said members being such that the ends of said rim members overlap to an extent, sufficient to accommodate wheels of various diameters and wear of the wheel lugs, and two pairs of members extending generally circumferentially in opposite directions, said members reacting against said wheel and connected, respectively, with the ends of said rim members for clamping the latter tightly against the associated lugs in spaced relation with respect to the wheel.

11. The combination with a traction wheel having at least two rows of generally radially extending lugs, each having a lateral opening extending therethrough transversely of the wheel, of a pair of roadbands, each consisting of a generally semi-circular member, one band being disposed over and embracing the radially outer ends of a plurality of lugs of one row and the other band being disposed over and embracing the radially outer ends of a plurality of lugs of the other row generally diametrically opposite to said first lugs, the adjacent ends of said bands overlapping to provide in effect a continuous cylindrical road engaging surface for said wheel and said bands being held against lateral displacement by virtue of embracing said lugs, fastening means carried by the opposite ends of each of said roadbands and extending generally along the periphery of the wheel, the fastening means of one band being disposed adjacent but extending in the opposite direction with respect to the fastening means of the other band when both bands are in place on the wheel, and means adjustably connecting each of said fastening means with an adjacent lug and having a part disposed in the transverse opening of the latter.

12. In a road band construction for traction wheels and the like having lugs, a generally circular channeled member having radially inwardly extending flanged margins adapted to be clamped against and embrace the outer ends of said lugs, and attaching means carried by the end portions of said channeled member, said attaching means including nut and bolt means and a yoke adapted to be adjustably connected to each end of said channeled member by said nut and bolt means and adapted to engage one of said wheel lugs.

13. In a road band construction for traction wheels and the like having lugs, a generally arcuate channeled member having radially inwardly extending flanged margins adapted to be clamped against and embrace the outer ends of said lugs, said channeled member also having a central depressed portion forming a peripheral groove, and attaching means carried by the end portions of said channeled member, said attaching means seated in said groove so as to lie at least partially below the rod contacting surface of said channeled member and adapted to be connected to certain of the lugs on the wheel.

ELLSWORTH T. JOHNSON.